(12) United States Patent
Lee

(10) Patent No.: US 10,577,495 B2
(45) Date of Patent: Mar. 3, 2020

(54) COMPLEX COMPOSITION OF STYRENE-BASED BLOCK COPOLYMER AND PBT RESIN

(71) Applicant: Youngil Co. Ltd., Gwangju, Gyeonggi-Do (KR)

(72) Inventor: Chung-Jin Lee, Seongnam-si (KR)

(73) Assignee: Youngil Co., Ltd., Gyeonggi-do (KR)

( * ) Notice: Subject to any disclaimer, the term of this patent is extended or adjusted under 35 U.S.C. 154(b) by 62 days.

(21) Appl. No.: 15/850,298

(22) Filed: Dec. 21, 2017

(65) Prior Publication Data
US 2018/0258275 A1 Sep. 13, 2018

(30) Foreign Application Priority Data

Mar. 7, 2017 (KR) .................. 10-2017-0028793

(51) Int. Cl.
| C08G 63/183 | (2006.01) |
| C08L 53/02 | (2006.01) |
| C08L 67/00 | (2006.01) |
| C08L 67/02 | (2006.01) |
| C08L 91/00 | (2006.01) |

(52) U.S. Cl.
CPC ............... *C08L 53/02* (2013.01); *C08L 67/00* (2013.01); *C08L 67/02* (2013.01); *C08L 91/00* (2013.01); *C08G 63/183* (2013.01); *C08L 2201/08* (2013.01); *C08L 2205/02* (2013.01); *C08L 2205/025* (2013.01); *C08L 2205/03* (2013.01); *C08L 2205/035* (2013.01); *C08L 2205/06* (2013.01); *C08L 2207/04* (2013.01)

(58) Field of Classification Search
CPC .......... C08L 53/02; C08L 67/02; C08L 67/00; C08L 91/00; C08L 2205/02; C08L 2205/06; C08L 2205/03; C08L 2207/04; C08L 2201/08; C08L 2205/035; C08L 2205/025; C08G 63/183
See application file for complete search history.

(56) References Cited

U.S. PATENT DOCUMENTS

| 4,102,854 A * | 7/1978 | Gergen | .................... | C08L 23/02 |
| | | | | 524/505 |
| 6,291,574 B1 * | 9/2001 | Gallucci | ................. | C08L 67/02 |
| | | | | 524/409 |
| 2003/0125442 A1 * | 7/2003 | Maris | ..................... | C08L 53/02 |
| | | | | 524/474 |

FOREIGN PATENT DOCUMENTS

| CN | 102838799 A | 12/2012 |
| CN | 105086495 A | 11/2015 |
| JP | 2013010859 A | 1/2013 |
| KR | 101696995 | 1/2017 |

OTHER PUBLICATIONS

Extended European Search Report dated Feb. 20, 2018, issued in corresponding European Patent Application No. 17182625.8.

* cited by examiner

*Primary Examiner* — Patrick D Niland
(74) *Attorney, Agent, or Firm* — Harness, Dickey & Pierce, P.L.C.

(57) ABSTRACT

The present invention relates to a complex composition of styrene-based block copolymer and PBT resin and, more particularly to, a complex composition of styrene-based block copolymer and PBT resin that uses a mixture of a styrene-based block copolymer, a paraffin oil and a polybutylene terephthalate (PBT) resin to compensate for the unfavorable factors of thermoplastic rubber (TPR), that is, the defects of properties, including weather resistance, thermal resistance, oil resistance, adhesiveness, and printability, etc., and to improve processability. In one preferred embodiment of the present invention, the complex composition comprises 10 to 200 parts by weight of a paraffin oil and 20 to 200 parts by weight of a polybutylene terephthalate (PBT) resin with respect to 100 parts by weight of a styrene-based block copolymer.

2 Claims, No Drawings

COMPLEX COMPOSITION OF STYRENE-BASED BLOCK COPOLYMER AND PBT RESIN

CROSS-REFERENCE TO RELATED APPLICATIONS

This patent application is based on and claims priority pursuant to 35 U.S.C. § 119(a) to Korean Patent Application No. 1020170028793 filed Mar. 7, 2017, in the Korean Intellectual Property Office, the entire disclosure of which is hereby incorporated by reference herein.

BACKGROUND OF THE INVENTION

The present invention relates to a complex composition of styrene-based block copolymer and PBT resin and, more particularly, to a complex composition of styrene-elastomer block copolymer and PBT resin that uses a mixture of polystyrene-elastomer block copolymer (TPR), paraffin oil and polybutylene terephthalate (PBT) resin to compensate for the unfavorable factors of thermoplastic rubber (TPR), that is, the defects of properties, such as weather resistance, thermal resistance, oil resistance, adhesiveness, and printability, etc., and to improve processability.

Polyvinyl chloride (PVC) is the most widely used synthetic resin due to its excellences in processability and properties, including weather resistance, tensile strength, elongation, scratch hardness, adhesiveness, abrasion resistance, etc. Particularly, soft PVC is a resin most widely used for vinyl leather, tarpaulin, films or sheets, injection molded products, extruded products, etc. Recently, the toxic properties of plasticizers on the human body and the environmental issues of the PVC resin have imposed prohibition or restriction on the use of PVC products. Yet, the PVC products are still widely used as a subsidiary material for bags, materials for construction or advertisement, and so forth.

In particular, when the PVC resin is used in combination with fabrics like artificial leather or tarpaulin, its waste is disposed through incineration to cause environmental and cost problems. The styrene-based block copolymer (thermoplastic rubber (TPR)), such as SBS, SEBS, SIS, SEPS, etc., substitute most of cured rubber or soft PVC, but it cannot be used as a complete constitute due to its defects of properties, including weather resistance, thermal resistance, oil resistance, adhesiveness, printability, etc.

As a solution to this problem, the styrene-based block copolymer is mixed with the PBT resin with good properties to enhance the properties so that it can be used as a more popular substitute for the soft PVC.

Generally, SBS is mixed with a process oil like paraffin oil or another resin, such as polystyrene (PS), polyethylene (PE), polypropylene (PP), etc., subjected to compounding (cutting after extrusion) and then primarily used as a material for injection molded products.

The SBS has the same favorable factors as rubber with good properties like cold resistance, elasticity, water resistance, and processability, but it is poor in oil resistance, weather resistance, abrasion resistance, and thermal resistance and displays poor extrusion processability. In order to compensate for this shortness, it is expected to improve when mixed with the PBT resin that has good properties and relatively good compatibility with the styrene-based block copolymer.

The background technique of the present invention is KR Registered Patent Publication No. 1004614 under the title of "PETG-based decor sheet for moulding that has similar moldability to PVC" (Patent Document 1). The background technique suggests a decor sheet comprising a PETG alloy resin prepared by alloying a polyethylene terephthalate glycol (PETG) resin with an elastomer resin, where the elastomer resin is a copolymer of a polybutylene terephthalate (PBT) resin and polyether glycol.

But, the prior technique provides a similar moldability to the PVC and is available for hard sheets and containers, yet it encounters a difficulty in the production of soft films or soft sheets because it is hard of softening.

PRIOR ART

Patent Documents

Patent Document 0001: KR Registered Patent Publication No. 1004614 under the title of "PETG-based décor sheet for moulding that has similar moldability to PVC"

BRIEF SUMMARY OF THE INVENTION

It is an object of the present invention to solve the problems with the prior art and to provide a complex composition of styrene-based block copolymer and PBT resin that uses a mixture of a styrene-based block copolymer, a paraffin oil and a polybutylene terephthalate (PBT) resin to compensate for the unfavorable factors of thermoplastic rubber (TPR), that is, the defects of properties, including weather resistance, thermal resistance, oil resistance, adhesiveness, and printability, etc., and to improve processability so that it can be a substitute for products with relatively low hardness (A hardness: 80 or below) such as soft PVC or cured rubber.

The present invention is to provide a complex composition of styrene-based block copolymer and polybutylene terephthalate (PBT) resin that comprises: 10 to 200 parts by weight of a paraffin oil and 20 to 200 parts by weight of a PBT resin in addition to 100 parts by weight of the styrene-based block copolymer.

The complex composition of styrene-based block copolymer and polybutylene terephthalate (PBT) resin further comprises: 20 to 200 parts by weight of a thermoplastic polyester elastomer (TPEE) resin with respect to 100 parts by weight of the styrene-based block copolymer.

Further, the styrene-based block copolymer comprises any one selected from the group consisting of styrene-butadiene-styrene (SBS), styrene-ethylene-butadiene-styrene (SEBS), styrene-isoprene-styrene (SIS), and styrene-ethylene-propylene-styrene (SEPS).

The complex composition of styrene-based block copolymer and PBT resin according to the present invention uses a mixture of a styrene-based block copolymer, a paraffin oil and a polybutylene terephthalate (PBT) resin to compensate for the unfavorable factors of thermoplastic rubber (TPR), that is, the defects of properties, including weather resistance, thermal resistance, oil resistance, adhesiveness, and printability, etc., and to improve processability so that it can be a substitute for products with relatively low hardness (A hardness: 80 or below) such as soft PVC or cured rubber.

DETAILED DESCRIPTION OF THE INVENTION

Hereinafter, the present invention will be described in detail with reference to the preferred embodiments, which are given only for the better understanding of the present invention and not intended to limit the scope of the present invention.

Reference will be made to the preferred embodiments of the present invention to describe the technical construction of the present invention in detail as follows.

In order to construct a composition excellent in weather resistance as well as cold resistance, thermal resistance and oil resistance, the present invention includes a mixture of a paraffin oil and a PBT resin, which have relatively good compatibility and miscibility with a styrene-based block copolymer (i.e., styrene-elastomer block copolymer (TPR)). And, the present invention further includes a TPEE resin that has good properties in regards to cold resistance, thermal resistance, weather resistance, etc., good processability and compatibility with TPR.

Examples of the styrene-based block copolymer (i.e., styrene-elastomer block copolymer (TPR)) as used herein may include styrene-butadiene-styrene (SBS), styrene-ethylene-butadiene-styrene (SEBS), styrene-isoprene-styrene (SIS), styrene-ethylene-propylene-styrene (SEPS), etc. The styrene-based block copolymer is commercially available as a substitute for soft PVC or cured rubber.

Mostly used are SBS and SEBS. SEBS is good in weather resistance, thermal resistance, and processability, but poor in adhesiveness and printability. SBS is relatively inexpensive, but poor in weather resistance, ageing resistance, thermal resistance, and oil resistance, relative to SEBS or SEPS.

The present invention uses a paraffin oil in place of a plasticizer in order to improve the processability of the styrene-based block copolymer (i.e., polystyrene-elastomer block copolymer (TPR)) and reduce the hardness. The paraffin oil may be added in an amount of 200 parts by weight. But it is preferable to use 200 parts by weight of the paraffin oil to obtain a composition having an A hardness of 10 or less.

The polybutylene terephthalate (PBT) resin is prepared from the reaction of terephthalic acid and 1,4-butanediol and isolated as an engineering plastic (EP). The resin is relatively high in heating derivation temperature, rigid, stiff, and good in abrasion resistance, weather resistance and electrical insulating properties, so it is primarily used for electronic products. The thermoplastic polyester elastomer (TPEE) resin is a block copolymer consisting of a hard segment (e.g., crystallizable glycol terephthalate) and a soft segment (e.g., amorphous elastomeric polytetramethylene ether terephthalate). The TPEE resin has properties characteristic to both rubber and engineering plastic and displays excellences not only in thermal resistance, cold resistance, and mechanical properties but also in compatibility and miscibility with other resins, such as PVC, TPU, PET, etc., particularly with PBT resin. The TPEE resin is a resin most suitable for improving the properties of the PBT resin but adversely expensive.

The paraffin oil is a process oil for TPR, such as SBS, SEBS or SIS, and primarily used to improve processability and control the hardness.

Out of TPR resins, SIS is chiefly used as an adhesive, and SEBS and SEPS are good in properties, such as tensile strength, elongation, etc., but poor in adhesiveness or printability due to the addition of ethylene or propylene. SBS is most poor in properties, including weather resistance, oil resistance, ageing resistance, thermal resistance, etc., but advantageously inexpensive and adhesive. Further, SBS is assumably capable of being reinforced with a resin with good properties such as PBT or TPEE resin. Accordingly, the embodiments of the present invention use SBS as a principal ingredient.

EXAMPLE 1

TABLE 1

Composition example for raw material (unit: kg)

| Ingredient | | SBS | White oil | PBT | PBT proportion (%) | Miscibility |
|---|---|---|---|---|---|---|
| Example | 1 | 100 | 100 | 10 | 5 | Good |
| | 2 | 100 | 100 | 20 | 10 | Good |
| | 3 | 100 | 100 | 40 | 20 | Good |
| | 4 | 100 | 100 | 60 | 30 | Good |
| | 5 | 100 | 100 | 80 | 40 | Good |
| | 6 | 100 | 100 | 100 | 50 | Good |
| | 7 | 100 | 100 | 150 | 75 | Good |
| | 8 | 100 | 100 | 200 | 100 | Poor |
| | 9 | 100 | 100 | 200 | 125 | Poor |

(1) SBS (Styrene-Butadiene-Styrene) resin is KTE101 supplied from Kumho Petrochemical Co., Ltd., Rep. of Korea.

(2) White oil is KIXX 150 supplied from GS Caltex, Rep. of Korea.

(3) PBT is GP1001S supplied from LG Chemicals Co., Ltd., Rep. of Korea.

(4) Proportion: PBT/SBS+white oil

In Example 1, compatibility and miscibility tests were performed on the SBS resin in the form of porous particle in the same manner as PVC.

Referring to Table 1, the test examples 1 to 7 involve adding 100 parts by weight of white oil with respect to 100 parts by weight of the SBS resin in a super mixer.

The white oil, also called "liquid paraffin", is prepared by redistillation, washing and bleaching of the oil portion of petroleum oil to filter out the lead portion. The white oil is a substance odorless and low in volatility and mainly consisting of alkyl naphthalenes.

The white oil is an oil of white color and good in compatibility, miscibility and absorbency with the styrene-based block copolymer. It is soluble in ether, chloroform, carbon disulfide, etc., but insoluble in water, alcohol, etc.

The mixing process is performed at about 50° C. for 10 minutes. The PVC is normally mixed at 100° C. for about 10 to 20 minutes and the SBS resin is mixed at relatively low temperature to prevent the formation of lumps (caking).

The TPR requires different processing conditions and displays different properties according to its type and item. The SEPS may be mixed with at least 400 parts by weight of an oil, but the SBS has an A hardness of 20 or less when mixed with 100 parts by weight of an oil.

As shown in Table 1, the white oil was mixed with 100 parts by weight of the SBS and, and the PBT was added in an amount of 10 (5%) to 250 (125%) parts by weight. The miscibility was then observed.

The most critical factor of the TPR compounding process is the melting process, of which the important factors are the melting temperature, compatibility, melting viscosity, and extrusion pressure of the resin to be added.

In order to observe the miscibility according to the difference in melting temperature and viscosity in this experimental example, the oil content of the TPR was increased to the maximum, and the amount of the PBT was raised up to 5 to 125% in a stepwise manner. According to the results of observation, the test examples 1 to 7 were good in miscibility, while the test example 8 was poor in miscibility with a little deterioration in properties (i.e., slight peeling) but expected to be improved, and the test example 9 had severe peeling.

The TPR consists of the hard segment of plastic dispersed in the soft segment of rubber, so its properties are dependent upon the types and added amounts of the rubber and plastic portions. The poor miscibility of the test examples 8 and 9 assumably comes down to an excess of the plastic portion added relative to the added amount of the rubber portion (i.e., the mixed amounts of SBS and oil).

In the test example 6, the A hardness was about 37±3, which was lower than the lowest hardness of the composition containing 150 parts by weight of a plasticizer with respect to 100 parts by weight of PVC and displayed good properties. When the content of the PBT was less than 20 parts by weight (10 wt. %), the mixing effect was nearly insignificant.

EXAMPLE 2

TABLE 2

Composition example for raw material (unit: kg)

| Ingredient | | SBS | White oil | PBT | TPEE | TPEE proportion (%) | Miscibility |
|---|---|---|---|---|---|---|---|
| Example | 1 | 100 | 100 | 100 | 0 | 0 | Poor |
| | 2 | 100 | 100 | 100 | 10 | 3.3 | Good |
| | 3 | 100 | 100 | 100 | 20 | 6.6 | Good |
| | 4 | 100 | 100 | 100 | 40 | 13.3 | Good |
| | 5 | 100 | 100 | 100 | 60 | 20 | Good |
| | 6 | 100 | 100 | 100 | 120 | 40 | Good |
| | 7 | 100 | 100 | 100 | 160 | 53.3 | Good |
| | 8 | 100 | 100 | 100 | 200 | 66.6 | Good |

| Ingredient | | Hardness (A) | Tensile strength (kgf/cm$^2$) | Elongation (%): width | Elongation (%): length | Elongation (%): derivation |
|---|---|---|---|---|---|---|
| Example | 1 | 46 ± 3 | 28 | 464 | 151 | 313 |
| | 2 | 48 ± 3 | 32 | 326 | 223 | 103 |
| | 3 | 52 ± 3 | 36 | 274 | 241 | 33 |
| | 4 | 57 ± 3 | 60 | 313 | 279 | 34 |
| | 5 | 64 ± 3 | 77 | 368 | 315 | 53 |
| | 6 | 83 ± 3 | 131 | 615 | 564 | 51 |
| | 7 | 85 ± 3 | 139 | 655 | 598 | 57 |
| | 8 | 87 ± 3 | 149 | 763 | 665 | 98 |

* TPEE proportion (%): TPEE/SBS + white oil + PBT

In Example 2, the effect of adding the TPEE resin to the complex composition of SBS, white oil and PBT was observed.

The TPR displayed different properties and processability depending on its type and item.

The SBS as used in the tests was KTR101 manufactured by Kumho Petrochemical Co., Ltd. that has a relatively large molecular weight and good absorbency to oil.

Generally, with an increase in the added amount of oil, the TPR resin tends to have good processability and a rapid drop of the hardness. In order to raise the hardness, another resin, such as PE, PP, PS, etc. is added, which generally causes deterioration in properties, including elasticity, elongation, etc. Yet, the TPR resin is relatively easy to reduce in hardness and does not have such a severe deterioration in properties.

However, an increase in the added amount of resins as a result of the addition of resins, such as PE, PP, or PS, inevitably causes peeling or deterioration in properties like reduction of elongation.

As for the test examples of Table 2, the miscibility was good but the tensile strength and elongation were poor, so 10 (3.3%) to 200 (66.6%) parts by weight of the TPEE resin was added in order to improve tensile strength and elongation. According to the observation, the properties were improved acceptably with at least 20 parts (6.6%) by weight of the TPEE resin and satisfactorily with about 200 parts by weight (66.6%) of the TPEE resin. But, when the added amount of the TPEE resin was greater than 200 parts by weight, the hardness was increased and the effect of improving properties was not that significant relative to the rise of the cost due to using an excess of the TPEE resin. Unlike the PP or PE resin, the TPEE resin did not lead to deterioration in the properties according to the increase of its added amount.

The specimens as used in the tests were prepared by injection process. Generally, poor compatibility or miscibility tends to cause severe derivation of elongation percentages in width and length. The same thing happened in the actual process of products.

Referring to Table 2, the derivation of the elongation percentages in width and length was severe in the test examples 1 and 2, which assumably resulted from the poor compatibility and miscibility. In the test examples 3 to 8, an increase in the added amount of the TPEE resin led to a rise of the average elongation percentages and a great drop of the deviation of the elongation percentages.

Relative to the addition of the PS resin (HIPS, K-RESIN, etc.), the addition of PBT and TPEE resins to the SBS as in the tests of Examples 1 and 2 greatly improved weather resistance, thermal resistance, adhesiveness, printability, etc., enhanced the touch and enabled the use of functional additives primarily added to the TPR, such as a flame retardant, an antifungal agent, a foaming agent, a filler, a modifier, etc. The TPR has been used mainly for the injection of parts or the like due to its poor properties in regards to thermal resistance, oil resistance, adhesiveness, printability, etc. With the construction of the present invention, the TPR is also available for the extrusion process of vinyl leather, vinyl sheets, hoses, etc., and the composition of the present invention can be used as a substitute for a considerably variety of soft PVC products due to its good properties regarding thermal resistance, cold resistance, elasticity, etc.

In conclusion, the complex composition of styrene-based block copolymer and PBT resin according to the present invention that uses a mixture of a styrene-based block copolymer, a paraffin oil and a polybutylene terephthalate (PBT) resin compensates for the unfavorable factors of thermoplastic rubber (TPR), that is, the defects of properties, including weather resistance, thermal resistance, oil resistance, adhesiveness, and printability, etc., and improves processability so that it can be used as a substitute for products with relatively low hardness (A hardness: 80 or below) such as soft PVC or cured rubber.

The foregoing description of the invention has been presented for purposes of illustration and description in detail with reference to the embodiments of the present invention. It is obvious for those skilled in the art that many modifications and variations are possible without departing from the principles and the substantial scope of the present invention. The present invention is limited by the scope of the claims of the present invention rather than such modifications or variations.

What is claimed is:

1. A complex composition of styrene-based block copolymer and polybutylene terephthalate (PBT) resin, comprising:
   10 to 200 parts by weight of a paraffin oil and 20 to 200 parts by weight of a PBT resin in addition to 100 parts by weight of the styrene-based block copolymer; and
   20 to 200 parts by weight of a thermoplastic polyester elastomer (TPEE) resin with respect to 100 parts by weight of the styrene-based block copolymer.

2. The complex composition of styrene-based block copolymer and polybutylene terephthalate (PBT) resin as claimed in claim 1, wherein the styrene-based block copolymer comprises any one selected from the group consisting of styrene-butadiene-styrene (SBS), styrene-ethylene-butadiene-styrene (SEBS), styrene-isoprene-styrene (SIS), and styrene-ethylene-propylene-styrene (SEPS).

* * * * *